Figure 1:
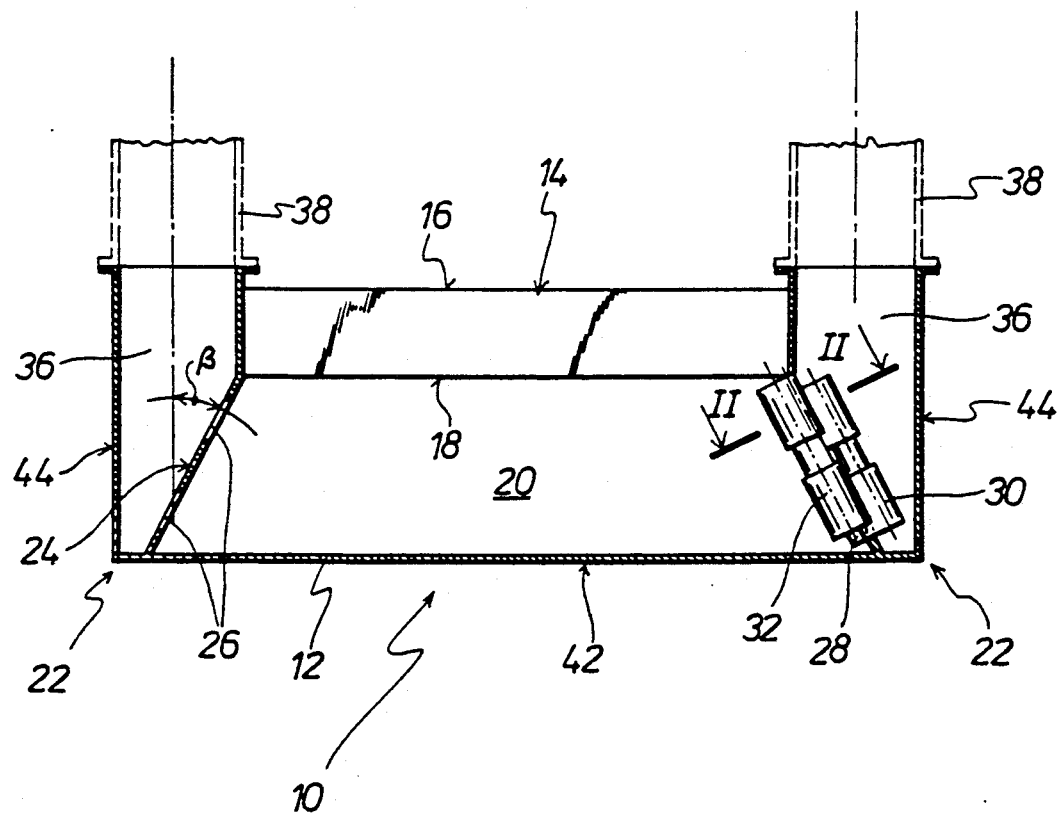

United States Patent [19]

Koehler

[11] Patent Number: 5,004,150

[45] Date of Patent: Apr. 2, 1991

[54] INSTALLATION FOR HEATING, VENTILATION OR AIR-CONDITIONING OF A LONG-DISTANCE BUS

[75] Inventor: Juergen Koehler, Spiegelslustweg, Fed. Rep. of Germany

[73] Assignee: Konvekta GmbH, Schwalmstadt, Fed. Rep. of Germany

[21] Appl. No.: 482,334

[22] Filed: Feb. 20, 1990

[30] Foreign Application Priority Data

Mar. 4, 1989 [DE] Fed. Rep. of Germany ....... 3907051
Apr. 8, 1989 [DE] Fed. Rep. of Germany ....... 3911515

[51] Int. Cl.$^5$ .............................................. B60H 1/02
[52] U.S. Cl. ................................ 237/12.3 A; 98/2.14; 62/244
[58] Field of Search .................... 237/12.3 A, 12.3 B; 98/2, 2.05, 2.14; 62/244

[56] References Cited

FOREIGN PATENT DOCUMENTS 3513952 10/1986 Fed. Rep. of Germany ..... 237/12.3 A
3720032 1/1989 Fed. Rep. of Germany ..... 237/12.3 A Primary Examiner—Henry A. Bennett
Attorney, Agent, or Firm—Arthur F. Zobal

[57] ABSTRACT

Described is an installation (10) for heating, ventilation or air-conditioning of a long-distance bus, which in a transverse direction in a housing (12) has a heat exchanger and, for passing air through the heat exchanger (14), radial-flow blowers (28, 30, 32) which are arranged one above the other and disposed in displaced relationship one behind the other. Downstream of the heat exchanger (14) the housing (12) has a collecting chamber (20) which is in fluid communication with longitudinal ducts (36) by way of two lateral corner regions (22). The radial-flow blowers are in the form of suction blowers (28, 30, 32) which are disposed in the corner regions (22) in two groups which are spatially separated from each other. The suction blowers (28, 30, 32) are arranged on partitioning walls (24) which are provided with openings (26) therethrough and which extend over the corner regions (22) between the housing (12) and heat exchanger (14) and which separate the collecting chamber (20) from the corresponding longitudinal duct (36). The suction blowers (28, 30, 32) are inclined at acute angles ($\alpha$, $\beta$) relative to the horizontal and relative to the longitudinal direction.

7 Claims, 4 Drawing Sheets

INSTALLATION FOR HEATING, VENTILATION OR AIR-CONDITIONING OF A LONG-DISTANCE BUS

The invention relates to an installation for heating, ventilation or air-conditioning of a long-distance bus, as set forth in the classifying portion of claim 1.

An installation of that kind is known from DE 35 13 952 A1. In that known installation the radial-flow blowers are in the form of pressure blowers which, in relation to the heat exchanger which is disposed in the transverse direction of the bus, are arranged upstream of the heat exchanger. The pressure blowers are preferably four-flow radial-flow blowers, that is to say radial-flow blowers with four inlet openings and two outlet openings. The blowers are disposed in two mutually superposed rows which are arranged in displaced relationship one behind the other, wherein the displacement of the two rows of blowers means that the structural height of the housing of the installation is reduced, in comparison with blowers which are supply arranged in superposed relationship. As a result of the vertical arrangement of the outlet openings of the blowers however, the structural height of that installation still leaves something to be desired. By virtue of the blowers being arranged upstream of the heat exchanger, the longitudinal dimension of the housing of that known installation is relatively large. That longitudinal dimension of the housing is also governed by the collecting chamber which is disposed downstream of the heat exchanger and into which flows the air that passes through the heat exchanger, in order then to flow on by way of the two lateral corner regions and the longitudinal ducts which are in fluid communication with the corner regions, into the roof ducts of the bus.

DE 37 20 032 A1 discloses a compact installation for heating, ventilation or air-conditioning of a long-distance bus which uses radial-flow blowers which are preferably of a four-flow type, in the form of suction blowers. Some of the blowers in that arrangement are arranged on inclined portions of a partitioning wall which is of a zigzag configuration so that the flow out of the outlet openings of the blowers can be directed as desired. That installation also provides that the blowers are distributed over the entire width of the installation, which is readily possible in that design configuration because the installation is a compact installation which is to be disposed in a rear portion of a bus, which is provided for that purpose.

The underlying object of the present invention is that of providing an installation of the kind set forth in the opening part of this specification, which is of a further reduced longitudinal size or which is of even more compact overall dimensions.

In accordance with the invention that object is achieved by the features of the characterising portion of claim 1. Therefore, the suction blowers are not arranged upstream of the heat exchanger but are disposed downstream thereof in the two corner regions which are to be found between the collecting chamber and the two lateral longitudinal ducts. Therefore the corner regions which are present in any case are utilised for accommodating the blowers, thereby advantageously affording the possibility of making the longitudinal dimension of the installation comparatively small. The inclined arrangement of the blowers of each of the two groups of blowers, that is to say the fact that the blowers, with their outlet openings, are arranged in such a way as to depart from the perpendicular, gives the further advantage that the dimension in respect of height of the installation is also comparatively small. That means however that the installation is overall relatively compact.

The acute angle at which the suction blowers of the or each blower group lie relative to the longitudinal direction of the bus can be between 0 and 90 degrees of angle.

An excellent level of efficiency with the installation being of compact dimensions is achieved if the radial-flow blowers are of four-flow type and if each of the two groups of blowers has three blowers which are arranged in closely adjacent superposed relationship and which are disposed in displaced relationship one behind the other as viewed in their common main discharge flow direction, which is established by the outlet openings. In such an installation the lower blower, as viewed in the common main discharge flow direction of the outlet openings, can be displaced forwardly relative to the upper blower and the middle blower, as viewed in the common main discharge flow direction of the outlet openings, can be displaced forwardly relative to the lower blower. The blowers of a group are therefore preferably not arranged in displaced relationship on a more or less straight line, but on an angled line. That arrangement can further improve the degree of compactness of the installation, without adversely affecting the conditions in regard to the feed flow to the blowers or the conditions in respect of discharge flow out of the outlet openings of the blowers. The above-mentioned main discharge flow direction of the blowers of a group is fixed by the orientation of the outlet openings of the suction blowers. In that connection it is possible for the outlet openings of the blowers of a group thereof to be directed in mutually parallel relationship or pivoted through given angles relative to each other. Irrespective of whether the outlet openings are directed in parallel relationship or pivoted relative to each other however, the outlet openings face in the above-mentioned common main discharge flow direction.

The blowers which are arranged in closely adjacent superposed relationship and which are displaced relative to each other in the above-described manner may all be arranged with their outlet openings at least approximately oriented in the same direction. It is also possible however for the lower blower to be arranged in such a way as to be turned through at least approximately 180 degrees of angle with respect to the upper and middle blowers, that is to say the outlet opening of the lower blower may be downward while the outlet openings of the middle and upper blowers face upwardly.

The blowers of a group, which are arranged in displaced relationship one behind the other in the common main discharge flow direction and one above the other may be arranged in overlapping superposed relationship, as viewed in their longitudinal direction. It has been found advantageous however for at least two of the three blowers of a group of blowers to be displaced relative to each other, as viewed in their longitudinal direction. That means that for example the upper blower can be arranged in displaced relationship relative to the adjacent middle blower and/or the middle blower can be arranged in displaced relationship with respect to the lower blower, as viewed in the longitudinal direction. In that situation it is possible for the displacement of the upper blower relative to the middle blower and the displacement of the middle blower relative to the lower blower to be of the same dimensions as each other or of different dimensions from each other. That is advantageous if the housing of the installation rises with an inclined surface from the collecting chamber to the longitudinal ducts in order for the installation to be of an advantageous configuration from the flow dynamics point of view. By virtue of the last-mentioned, at least one displacement, it is possible for the blowers of a group to be disposed in a space-saving arrangement in the for example sloped corner region between the collecting chamber and the associated longitudinal duct of the installation.

Figure 2:
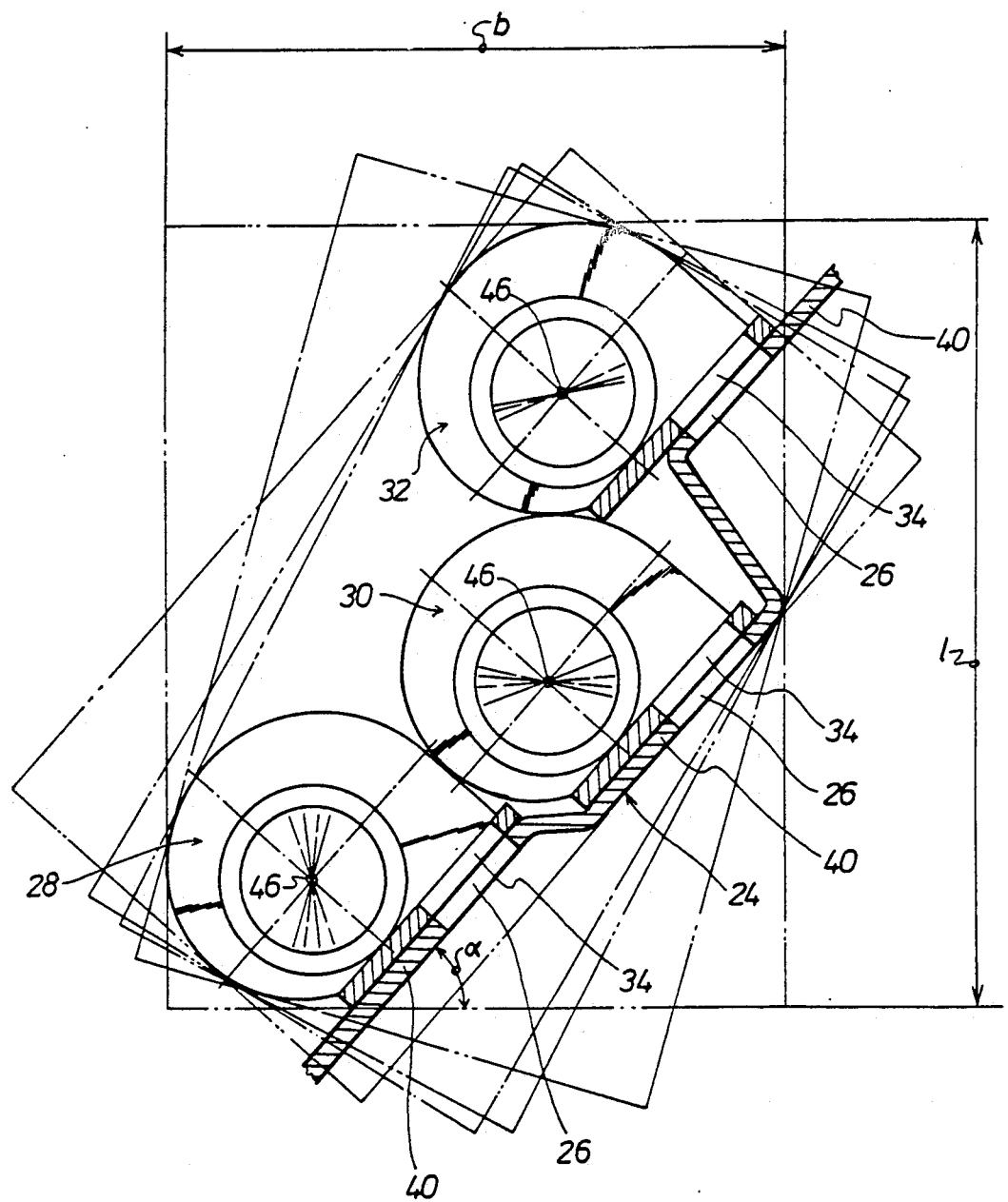
Figure 3:
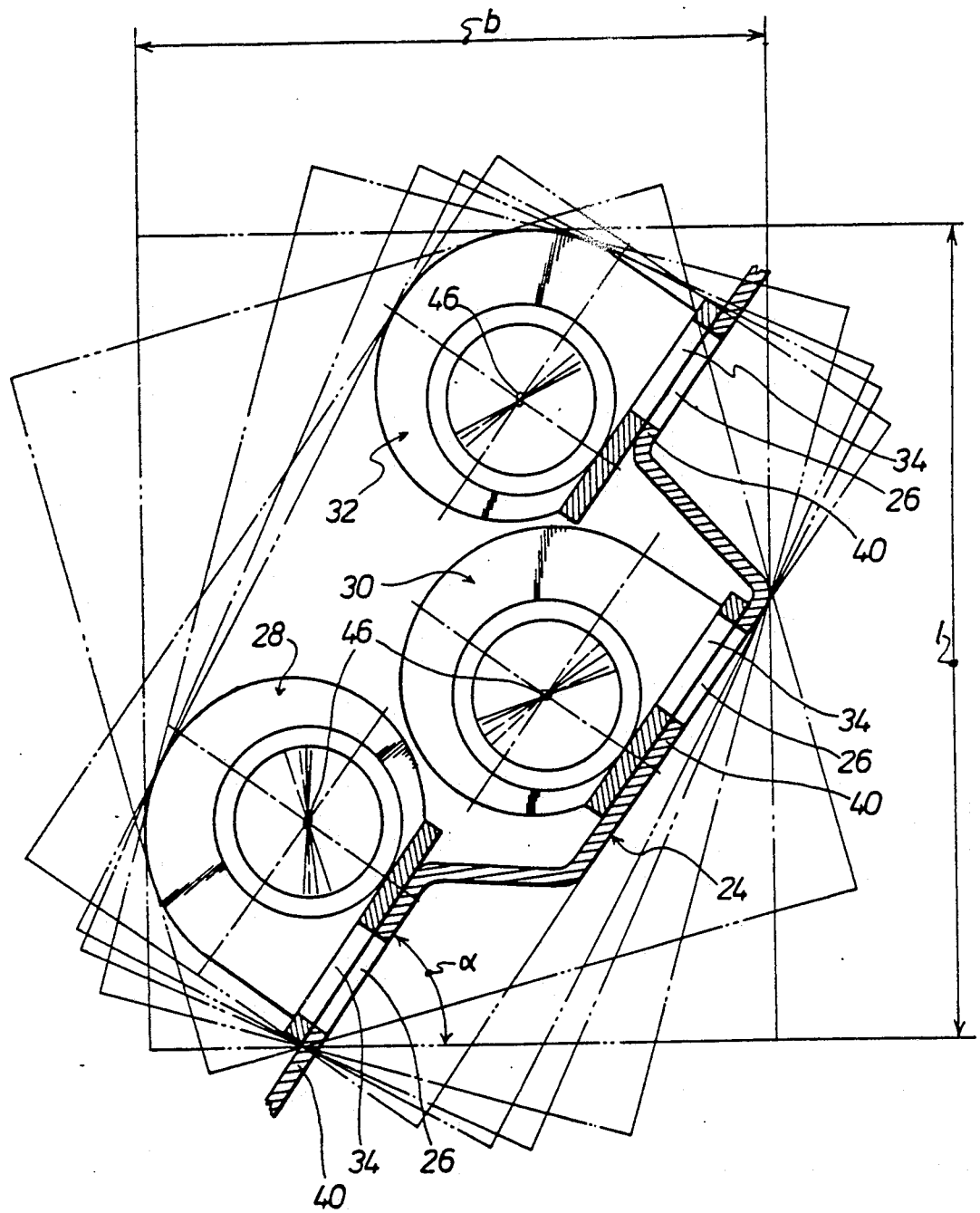
Figure 4:
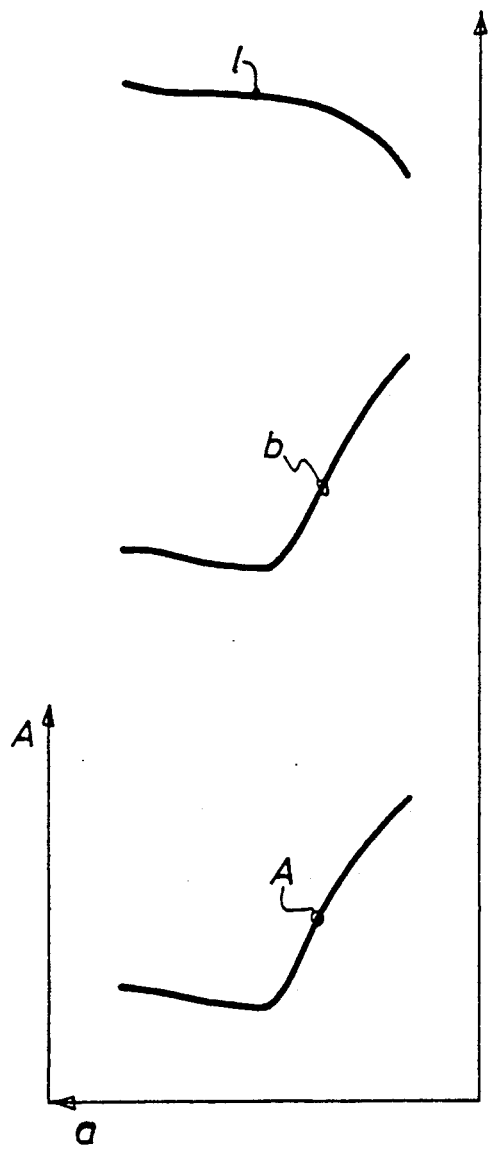
Figure 5:
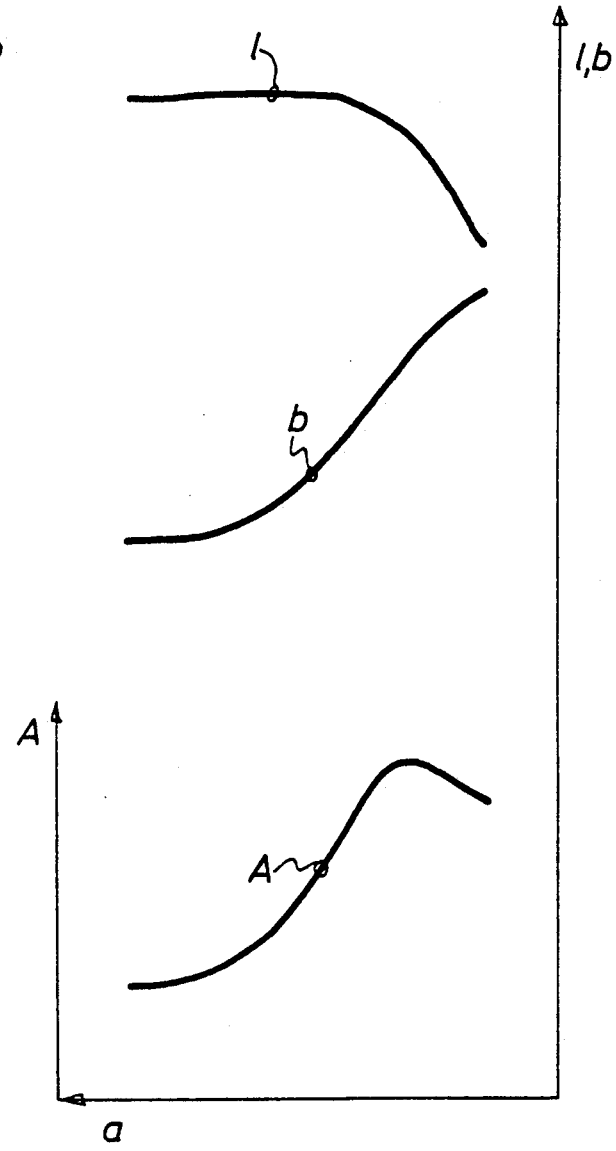

An embodiment of the installation according to the invention for heating, ventilation or air-conditioning of a bus is described hereinafter and diagrammatically illustrated in the drawings in which:

FIG. 1 is a view of the installation from above, with the cover which closes off the housing of the installation at the top side thereof having been removed in order to show a sectional view of a group of blowers on the right-hand side and a partitioning wall on the left-hand side, FIG. 2 is a view in section taken along line II—II in FIG. 1, FIG. 3 is a view in section corresponding to that shown in FIG. 2, through another arrangement of the blowers of a group of blowers, FIG. 4 shows the functional relationship between length 1, width b and cross-sectional area A of a group of blowers as shown in FIG. 2 in dependence on the angle of inclination $\alpha$ between the partitioning wall and the bottom of the installation, which preferably disposed in a horizontal direction, and FIG. 5 shows the functional relationship between length 1, width b and cross-sectional area A of a group of blowers as shown in FIG. 3 in dependence on the angle of inclination $\alpha$ between the partitioning wall and the bottom of the installation.

FIG. 1 is a diagrammatic view of an installation 10 for heating, ventilation or air-conditioning of a long-distance or tour bus which comprises a housing 12 with a heat exchanger 14 therein. The heat exchanger 14 is connected to other per se known units of an air-conditioning installation, which are not illustrated in FIG. 1. Air flows through the heat exchanger 14 from its intake side 16 and leaves the heat exchanger 14 at its discharge flow side 18, to pass into a collecting chamber 20. The collecting chamber 20 is closed off at the sides by respective partitioning walls 24 which extend in the respective corner region 22 of the installation 10. A partitioning wall 24 which is inclined relative to the longitudinal direction at an acute angle $\beta$ is diagrammatically shown in FIG. 1 on the left-hand side thereof, that is to say in the left-hand corner region 22. The heat exchanger 14 is disposed in the transverse direction of the installation 10. The/each partitioning wall 24 has openings 26 therethrough, while four-flow suction blowers 28, 30 and 32 are arranged with their outlet openings 34 at the openings 26 (see FIGS. 2 and 3). The outlet openings 34 are aligned with the associated openings 26 through the or each partitioning wall 24, as can be clearly seen from FIGS. 2 and 3. At each of the two partitioning walls 24, three four-flow suction blowers 28, 30 and 32 are arranged in closely adjacent superposed relationship and in mutually displaced relationship. Accordingly, the two associated partitioning walls 24 are of a bent configuration, as can be clearly seen from FIGS. 2 and 3. By means of the group of blowers arranged in the two corner regions 22 and consisting of the suction blowers 28, 30 and 32, the air is drawn through the heat exchanger 14 into the collecting chamber 20, passed through the suction blowers 28, 30 and 32 and introduced into the two lateral longitudinal ducts 36 of the installation 10. The longitudinal ducts 36 are disposed at a spacing from each other which corresponds to the spacing of the roof ducts 38 of a bus, as shown in broken lines in FIG. 1.

FIG. 2 is a side view of a group of blowers consisting of three four-flow suction blowers 28, 30 and 32, wherein the middle suction blower 30 is displaced downstream relative to the lower suction blower 28, in the main discharge flow direction established by the outlet openings 34, and the upper suction blower 32 is displaced upstream relative to the middle suction blower 30 and relative to the lower suction blower 28. In addition the partitioning wall 24 with its partitioning wall portions 40 having the openings 26 is inclined relative to the bottom of the installation 10 by an angle $\alpha$. FIGS. 2 and 3 show some mutually different angles of inclination $\alpha$ at which the suction blowers 28, 30 and 32 can be inclined with their outlet openings 34, relative to the bottom of the installation 10. In the illustrated embodiment the outlet openings 34 are directed in mutually parallel relationship, but it will be appreciated that it is also possible for the outlet openings 34 and accordingly the partitioning wall portions 40 to be inclined relative to each other.

FIG. 1 shows in the right-hand corner region 22 the three suction blowers 28, 30 and 32 which are disposed in superposed relationship wherein the upper suction blower 32 is arranged in displaced relationship towards the heat exchanger 14, in relation to the middle and lower suction blowers 30 and 28, as viewed in the longitudinal direction of the suction blowers. Such a displaced arrangement of the suction blowers makes it possible for the housing 12 of the installation 10 to rise at an inclined angle from the rear side 42 and from the outward sides 44, towards the heat exchanger 14. It will be appreciated that it is also possible for all three suction blowers 28, 30 and 32 to be arranged in mutually displaced relationship in the longitudinal direction.

FIG. 4 shows the relationship between the length 1, the width b and the cross-sectional area A of a group of blowers, as is determined by the length 1 and the width b, with the angle of inclination $\alpha$ between the blowers 28, 30 and 32 and the bottom of the installation 10, when the blowers 28, 30 and 32 are so arranged as shown in FIG. 2, in which respect FIG. 2 shows a width b and a length 1 of one of the possible cross-sectional areas A. In comparison thereto, FIG. 5 shows the relationship between the length 1, the width b and the cross-sectional area A, as determined by the length 1 and the width b, with the angle of inclination $\alpha$ between the blowers 28, 30 and 32, that is to say the outlet openings 34 of the blowers 28, 30 and 32, with the bottom of the installation 10, when the suction blowers 28, 30 and 32 are arranged as shown in FIG. 3. As already mentioned the blower configuration shown in FIG. 2 differs from the blower configuration shown in FIG. 3 in that in FIG. 2 all the suction blowers are arranged with their outlet openings 34 oriented in the same direction, in relation to the longitudinal centre lines 46 of the suction blowers 28, 30 and 32, while in the arrangement shown in FIG. 3 the lowermost suction blower 28 is arranged with its outlet opening 34 turned through 180 degrees of angle relative to the other suction blower 30 and 32.

It will be apparent from the drawings that the fact that the suction blowers are arranged closely adjacent and one above the other in displaced relationship not on a straight line means that only a relatively small amount of space is required for the suction blowers 28, 30 and 32 so that the installation 10 can be very compact, that is to say in particular it is of a very small longitudinal dimension. It is for the same purpose if the two groups of blowers are arranged in the corner regions 22 of the installation in an inclined position relative to the longitudinal direction at an acute angle $\beta$.

I claim:

1. An installation for heating, ventilation or air-conditioning of a bus comprising a housing (12) which transversely with respect to the longitudinal direction of the bus has a heat exchanger (14) and radial-flow blowers (28, 30, 32) which are arranged in superposed and displaced relationship one behind the other for conveying air through the heat exchanger (14), wherein downstream of the heat exchanger (14) the housing (12) has a collecting chamber (20) which is communicated by way of two lateral corner regions (22) with longitudinal ducts (36) to which are connected roof ducts (38) which extend in the longitudinal direction of the bus, characterised in that the radial blowers (28, 30, 32) are arranged in the form of suction blowers in two groups which are spatially separated from each other downstream of the heat exchanger (14), wherein the blowers (28, 30, 32) of each group of blowers are arranged with their outlet openings (34) at respective openings (26) through an associated partitioning wall (24) which extends over the respective corner region (22) between the housing (12) and the heat exchanger (14) and separates the collecting chamber (20) from the associated longitudinal duct (36), and that the partitioning walls (24) with the blowers (28, 30, 32) disposed on the openings (26) therethrough are inclined through an angle $\alpha$ relative to the horizontal and are inclined through an acute angle $\beta$ relative to the longitudinal direction in regard to their orientation (40) between the collecting chamber (20) and the two lateral longitudinal ducts (36).

2. An installation as set forth in claim 1 characterised in that the radial-flow blowers (28, 30, 32) are of a four-flow configuration and that each of the two groups of blowers comprises three blowers (28, 30, 32) which are arranged in closely adjacent superposed relationship and which are arranged in displaced relationship one behind the other as viewed in their common main discharge flow direction which is established by the outlet openings (34).

3. An installation as set forth in claim 2 characterised in that the lowermost blower (28) is displaced forwardly relative to the upper blower (32), as viewed in the common main discharge flow direction of the outlet openings (34), and the middle blower (30) is displaced forwardly relative to the lower blower (28), as viewed in the common main discharge flow direction of the outlet openings (34).

4. An installation as set forth in claim 2 or claim 3 characterised in that the lower blower (28) is arranged in a position of being turned through at least approximately 180 degrees of angle, in relation to the upper and the middle blowers (32, 30).

5. An installation as set forth in one of claims 2 through 4 characterised in that at least two of the three blower (28, 30, 32) of a group of blowers are displaced relative to each other as viewed in their longitudinal direction.

6. An installation as set forth in claim 5 characterised in that at least the upper blower (32) is arranged in displaced relationship with the adjacent middle blower (30) as viewed in their longitudinal direction.

7. An installation as set forth in one of claims 1 through 6 characterised in that the outlet openings (34) of the blower (28, 30, 32) of a/each group of blowers are directed at least approximately parallel to each other.

* * * * *